United States Patent Office 3,115,501
Patented Dec. 24, 1963

3,115,501
SULTONE MANUFACTURE
Harry De V. Finch, Berkeley, George W. Hearne, Lafayette, and John A. Whitcombe, Orinda, Calif., assignors to Shell Oil Company, New York, N.Y., a corporation of Delaware
No Drawing. Filed May 5, 1961, Ser. No. 107,899
4 Claims. (Cl. 260—327)

This invention relates to a process for preparing the sultone of a hydroxyalkane sulfonic acid. More particularly, the invention relates to an improved process for dehydrating and cyclizing such acids to yield their sultones.

Practically all of the aliphatic sultones reported in the literature were obtained by direct distillation of the halogen- or hydroxysulfonic acids, splitting off hydrohalogenic acid or water at about 140–150° C. In many cases, this distillation was carried out at reduced pressure because many hydroxyalkane sulfonic acids decompose at dehydration temperatures without sultone formation, however, generally low yields are obtained by such distillation.

The chief reason why distillation, even under reduced pressure, is unsatisfactory, is that decomposition of the hydroxysulfonic acids to sulfur dioxide increases as these acids are maintained at the elevated distillation temperatures. In particular, the decomposition occurs at the surfaces of the distillation kettle, where the skin temperature may be materially higher than the temperature of the liquid hydroxyalkane sulfonic acid being treated. When the distillation is conducted under reduced pressure, the sulfur dioxide is circulated through the pumping system, increasing the effective pressure of the system and thus reducing the efficiency of the distillation.

It is an object of the present invention to provide an improved process for dehydrating and cyclizing a hydroxyalkane sulfonic acid to produce the sultone thereof. A further object of the invention is the provision of an improved low-pressure process for providing the sultone of hydroxyalkane sulfonic acid in good yield. Still another object is the provision of an economical process for cyclizing hydroxyalkane sulfonic acids to their sultones with a minimum of decomposition. An improved process for preparing propanesultone from 3-hydroxypropane sulfonic acid is still another object of the invention. Other objects will be apparent from the following detailed description of the process of the invention.

These objects are accomplished in the invention by the process which comprises contacting at a pressure up to about 760 mm. a non-gaseous medium containing hydroxyalkane sulfonic acid with an inert gas, said gas having a temperature of at least about 100° C., and separating the resulting sultone from the gas.

The hydroxyalkane sulfonic acids treated in the process of the invention are those acids which consist essentially of an alkane chain having a sulfonic acid substituent —SO₃H attached to one carbon atom of the chain and a hydroxyl group attached to another carbon atom of the chain. Preferably, the carbon atom to which the hydroxyl group is attached is at least one chain carbon atom removed from the carbon atom to which the sulfonic acid radical is attached. Thus, the hydroxyalkane sulfonic acids of the invention have the general structure

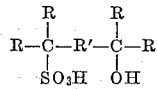

where each R is selected from the group consisting of the hydrogen atom and alkyl radicals, and R′ is an alkylene radical of up to 2 carbon atoms, preferably 1,1-alkylene. Preferred compounds are those wherein R′ is methylene or R-substituted methylene and each R is hydrogen or alkyl of up to 4 carbon atoms. The total number of carbon atoms in the particularly preferred compounds is from three to eight.

Typical hydroxyalkane sulfonic acids of this type include 3-hydroxypropane-1-sulfonic acid; 4-hydroxybutane-1-sulfonic acid; 3-hydroxybutane-1-sulfonic acid; 4-hydroxybutane-2-sulfonic acid; 4-hydroxypentane-2-sulfonic acid; 5-hydroxypentane-1-sulfonic acid; 4-hydroxypentane-2-methyl-2-sulfonic acid; 6-hydroxyheptane-4-sulfonic acid; 3-hydroxyheptane-1-sulfonic acid; 4-hydroxyheptane-1-sulfonic acid; 6-methyl-3-hydroxyheptane-1-sulfonic acid; 2-hydroxydecane-4-sulfonic acid; and 1-phenyl-3-hydroxybutane-1-sulfonic acid. Of these, the preferred embodiment is 3-hydroxypropane-1-sulfonic acid.

The hydroxyalkane sulfonic acid is dehydrated and cyclized to the sultone by contacting it with inert gas while the acid is in the liquid phase. In general, the liquid phase will most conveniently comprise an aqueous solution of the acid, the solution preferably containing from about 10% w. of the acid to about 90% w. of the acid. However, if desired, the acid may be employed in its molten form at a temperature between its melting point and its boiling point at the pressure of the system. Alternatively, the acid may be employed dissolved in an organic liquid such as an ether, e.g., tetrahydrofurane, diamyl ether, dioxane, Cellosolve; a paraffin, such as pentane, hexane, heptane, decane, nonane or the like; or an aromatic solvent such as benzene, toluene, xylene, or the like, in similar concentration. The liquid phase may be maintained at any convenient temperature, the preferred temperature range being from about 100° C. to about 225° C.

The hydroxyalkane sulfonic acid is effectively contacted with the inert gas by passing the gas through the liquid comprising the acid. This contacting is practiced by methods known in the art, such as sparging, blowing or the like. The gas employed should be at a temperature such that condensation or solution of the gas in the liquid phase is minimized. A gas temperature of at least 100° C. is preferred, the maximum temperature employed being the decomposition temperature of the sultone prepared. Best results have been obtained by using gases heated to a temperature between about 100° C. and about 250° C., although lower or higher temperatures may be employed.

The gas used is most conveniently gas which is inert under the reaction conditions employed. Preferred gases include steam, carbon dioxide, nitrogen, and such totally inert gases as helium, argon, neon, xenon, and krypton. Such gases as methane, ethane, propane, and hexane may also be used, preferred alkanes having up to 8 carbon atoms.

An important advantage of the use of the inert gas for separating the sultone from the liquid sulfonic acid phase is the economical utilization of heat energy effected thereby. Thus, part or all of the heat required for the dehydrative ring closure and volatilization of the sultone is supplied by the gas itself as sensible heat. In this way, the amount of heat required to be supplied to the reaction system by heat transfer through the walls of the reaction vessel, with the associated hazard of acid decomposition, is materially reduced.

The separation of the sultone from the hydroxyalkane sulfonic acid in this manner is accomplished at a pressure up to about 760 mm. Hg, that is, at or below atmospheric pressure. The preferred pressure range is from about 1 mm. Hg to about 760 mm. Hg, but the pressure and temperature at which the separation is performed will depend on the sultone being prepared. One of the attractive features of the process described is that it may be efficiently performed at only moderately reduced pressure, or even at atmospheric pressure, the range of about 50 mm.

Hg to about 760 mm. Hg being operative. As a consequence, the requirement for costly mechanical pumping equipment necessary to maintain high vacuums is avoided.

The sultone is recovered from the gas stream by conventional methods, such as condensation, scrubbing, extraction and the like. For example, the gas-sultone mixture may readily be passed to a packed tower and scrubbed with a liquid in which the sultone is miscible, e.g., xylene, toluene, benzene or the like. Alternatively, the sultone may be recovered by passing the gas mixture into a cold trap wherein the sultone is condensed, or by passing the stream into solvent. The sultone may be then recovered and purified by such methods as extraction, crystallization, fractional distillation or similar methods.

By employing the process described, the sultones of the starting hydroxyalkane sulfonic acid are readily obtained in high yield and with a minimum of degradation. A particular advantage of the invention is the production of such sultones with substantially no accompanying generation of sulfur dioxide.

In this manner, the sultones derived from the starting acids are readily produced. These sultones have in general the structure

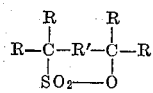

where R and R' have the above meanings. Typical sultones obtained by the process of the invention include 1-propane sulfonic acid 3-hydroxysultone; 1-butane sulfonic acid 4-hydroxysultone; 1-butane sulfonic acid 3-hydroxysultone; 2-butane sulfonic acid 4-hydroxysultone; 2-pentane sulfonic acid 4-hydroxysultone; 1-pentane sulfonic acid 5-hydroxysultone; 2-methyl-2-pentane sulfonic acid 4-hydroxysultone; 4-heptane sulfonic acid 6-hydroxysultone; 1-heptane sulfonic acid 3-hydroxysultone; 1-heptane sulfonic acid 4-hydroxysultone; 6-methyl-1-heptane sulfonic acid 3-hydroxysultone; 3-methyl-4-heptane sulfonic acid 2-hydroxysultone; and the like.

The process of the invention may be conducted in a batch, semi-batch or continuous method. For example, the sultone may be continuously stripped from an aqueous reaction system in which alkali metal hydroxyalkane sulfonates are sprung to the acid by use of mineral acids or acidic ion-exchange resins. Alternatively, the liquid acid may be fed to a vessel wherein it is contacted with the hot inert gas in countercurrent manner.

Sultones may also be prepared from solids or semi-solid sulfonic acids by use of the process described. Thus, treating dry hydroxyalkane sulfonic acid or a salt thereof under reduced pressure with heated inert gas, such as nitrogen, will efficiently produce the sultone. Alternatively, by stripping a slurry of sulfuric acid and sodium-3-hydroxypropane sulfonate with nitrogen or similar gas, propanesultone is provided virtually quantitatively.

To illustrate further the novel process of the invention, the following specific examples are set forth. It should be understood, however, that these examples are merely illustrative and are not to be regarded as limitations to the appended claims, since the basic teachings therein may be varied at will as will be understood by one skilled in the art. In the examples, the proportions are expressed in parts by weight unless otherwise noted.

EXAMPLES

The following runs were performed at a pressure of 100 mm. Hg. In run 1, crude 3-hydroxypropane sulfonic acid was heated batchwise in an oil bath to 188–190° C. Steam preheated to 190° C. was passed through the acid. The distillate was collected in a water-cooled condenser and analyzed for free sulfonic acid and for propanesultone.

In run 2 the acid was fed continuously to the kettle at 188–190° C. and was stripped with steam as in run 1. The stripped product was analyzed as in the first run.

In run 3 a continuous feed of the sulfonic acid was used and the steam-sultone stream was passed first through an air-cooled condenser and then through a water-cooled condenser.

In run 4 the sulfonic acid was distilled at 100 mm. Hg without the aid of a stripping gas. The results of these runs are presented in Table I.

*Table I*

| Run: | Moles sultone recovered per mole acid charged |
|---|---|
| 1 | 0.769 |
| 2 | 0.712 |
| 3 | 0.760 |
| 4 | 0.724 |

In another run, nitrogen heated to 190° C. was passed at a rate of 8.3 liters/minute (NTP) through a kettle heated in an oil bath to 204° C. Crude hydroxypropane sulfonic acid was fed to the kettle at a rate of 1 g./min. for a total of 98 g. of feed. The kettle was maintained at atmospheric pressure. The nitrogen-sultone stream was passed to a packed tower and scrubbed with cold xylene, residual xylene and sultone vapor being removed from the column gas in a cold trap. At the end of the run the xylene scrubber liquid contained a lower layer which was mainly propane sultone and water.

Analysis of the xylene layer and the lower layer from the scrubber, and of the cold trap condensate indicated a 66.6% yield based on the total acid fed. Distribution of products was as follows:

*Table II*

| | $SO_2 + H_2SO_3$ | Sulfonic Acid | Sultone |
|---|---|---|---|
| Scrubber xylene layer | 0.0094 | 0.050 | 0.240 |
| Scrubber aqueous layer | 0.0005 | 0.004 | 0.115 |
| Cold trap | 0.0066 | 0.0001 | 0.002 |
| | 0.0165 | 0.054 | 0.357 |

When the vapors from a similar nitrogen-stripped run were collected with a water-cooled condenser, white color-stable propanesultone was obtained in corresponding yield.

We claim as our invention:

1. A process for preparing sultones from corresponding hydroxyalkane sulfonic acids of from 3 to 8 carbon atoms and represented by the formula

wherein the R's are selected from the group consisting of hydrogen and alkyl of 1 to 2 carbon atoms and R' is an alkylene radical of from 1 to 2 carbon atoms which comprises passing through such a hydroxyalkane sulfonic acid in molten state at a temperature of 100° C. to 225° C. and at a pressure of from 1 mm. Hg to 760 mm. Hg a pre-heated inert gas having a temperature between 100° C. and 250° C. to effect dehydrative ring closure of said hydroxyalkane acid to the corresponding sultone and to produce a gas stream of said inert gas containing the vaporized sultone, separating said gas stream containing said vaporized sultone from the remaining molten material and subsequently recovering said sultone in said gas stream from said inert gas.

2. The process according to claim 1 wherein the hydroxyalkane sulfonic acid is 3-hydroxy-propane sulfonic acid.

3. The process according to claim 2 wherein the inert gas is steam.

4. The process according to claim 2 wherein the inert gas is nitrogen.

References Cited in the file of this patent

Theilheimer: Synthetic Methods of Organic Chemistry, volume 11, page 280 (1957).